United States Patent
Kim et al.

(10) Patent No.: US 8,666,615 B1
(45) Date of Patent: Mar. 4, 2014

(54) METHOD OF CONTROLLING TRANSMISSION OF VEHICLE

(71) Applicant: Hyundai Motor Company, Seoul (KR)

(72) Inventors: Joung Chul Kim, Suwon-si (KR); Young Min Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/689,179

(22) Filed: Nov. 29, 2012

(30) Foreign Application Priority Data

Sep. 25, 2012 (KR) .......................... 10-2012-0106517

(51) Int. Cl.
*G06F 7/00* (2006.01)
(52) U.S. Cl.
USPC ........................................................... 701/51
(58) Field of Classification Search
USPC .............................. 701/51, 57, 59, 64, 67, 70
See application file for complete search history.

(56) References Cited

U.S. PATENT DOCUMENTS

| | | | |
|---|---|---|---|
| 5,303,153 A * | 4/1994 | Sakai et al. | 701/57 |
| 5,305,240 A | 4/1994 | Davis et al. | |
| 5,377,797 A * | 1/1995 | Mustapha et al. | 192/3.55 |

FOREIGN PATENT DOCUMENTS

| | | |
|---|---|---|
| KR | 10-0300292 B1 | 11/2001 |
| KR | 10-2010-0050710 A | 5/2010 |

* cited by examiner

*Primary Examiner* — Kim T Nguyen
(74) *Attorney, Agent, or Firm* — Morgan, Lewis & Bockius LLP

(57) ABSTRACT

A method of controlling a transmission of a vehicle with a DCT or AMT in which a reference center point of an actuator for gear shifting with respect to a shift direction can always be maintained at a correct position. Therefore, despite different kinds of electrical disturbances or mechanical vibration or deformation which may be caused when the vehicle is running, reliable gear shifting manipulation ability can always be secured, thus enhancing the merchantability of the vehicle.

6 Claims, 3 Drawing Sheets

METHOD OF CONTROLLING TRANSMISSION OF VEHICLE

CROSS-REFERENCE TO RELATED APPLICATION

The present application claims priority of Korean Patent Application Number 10-2012-0106517 filed Sep. 25, 2012, the entire contents of which application is incorporated herein for all purposes by this reference.

BACKGROUND OF INVENTION

1. Field of Invention

The present invention relates generally to a method of controlling a transmission of a vehicle and, more particularly, to a technique for initializing a shift-direction reference center point when shifting gears using an actuator in a DCT (dual clutch transmission) or an AMT (automated manual transmission).

2. Description of Related Art

In conventional DCTs or AMTs which are operated in such a way that an actuator shifts the gears, when a vehicle is in an IG ON state, a reference center point in a shift direction is first learned and initialized before the gear shifting is carried out.

After a shift-direction reference center point has been learned when in the IG ON state, as shown in FIG. 1, gear shifting continues without carrying out a separate reference point compensation process. However, when the vehicle is running, the shift-direction reference center point of the actuator may be dislocated by electrical disturbance related to the actuator or mechanical vibration or deformation. In this case, when the actuator is excessively operated in the shift direction, a shock is generated. In addition, when the operation of the actuator is too small, a balking phenomenon in which shift gears which are engaging with each other are separated from each other, or a jump-out phenomenon in which shift gears which have engaged with each other are removed from each other, is caused. Therefore, smooth and reliable gear shifting manipulation ability cannot be secured.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art. Various aspects of the present invention provide for a method of controlling a transmission of a vehicle provided with a DCT or AMT such that a reference center point of an actuator for gear shifting with respect to a shift direction can always be maintained at a correct position, so that despite different kinds of electrical disturbances, mechanical vibration, or deformation which may be caused when the vehicle is running, reliable gear shifting manipulation ability can always be secured, thus enhancing the merchantability of the vehicle.

Various aspects of the present invention provide for a method of controlling a transmission of a vehicle, including: an end position memorizing operation of memorizing positions of opposite ends of a shift-direction actuator with respect to a shift direction when the shift-direction actuator shifts gears; a stroke calculation operation of calculating a total shift-direction stroke using the positions of the opposite ends of the shift-direction actuator with respect to the shift direction that are obtained by the end position memorizing operation; a validity determining operation of comparing the total stroke calculated in the stroke calculation operation with a reference stroke and determining validity of the total stroke; a center determining operation of comparing a medial position of the total stroke with a current shift-direction reference center point when the total stroke has been determined to be valid in the effectiveness determining operation, and determining whether the medial position is within a predetermined critical range; and a center compensating operation of resetting the shift-direction reference center point when the medial position has been determined to be not within the critical range in the center determining operation.

According to various aspects of the present invention, in a vehicle provided with a DCT or AMT, a reference center point of an actuator for gear shifting with respect to a shift direction can always be maintained at a correct position. Therefore, despite different kinds of electrical disturbances, mechanical vibration, or deformation which may be caused when the vehicle is running, reliable gear shifting manipulation ability can always be secured, thus enhancing the merchantability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
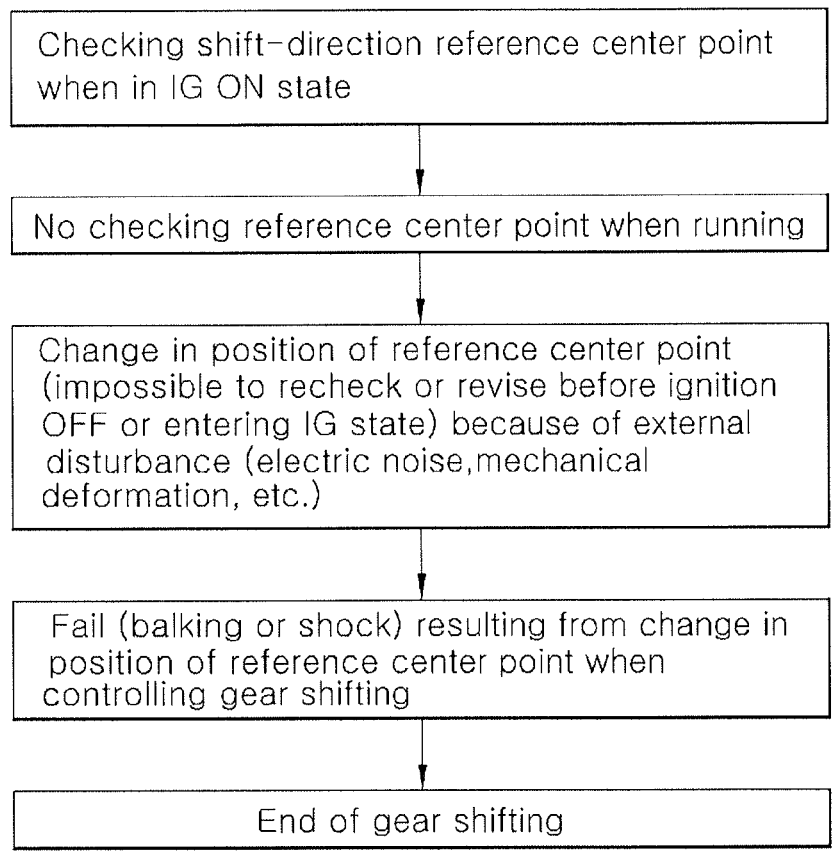
FIG. 1 is a view showing explanation related to setting a shift-direction reference center point of a conventional shift-direction actuator.
Figure 2:
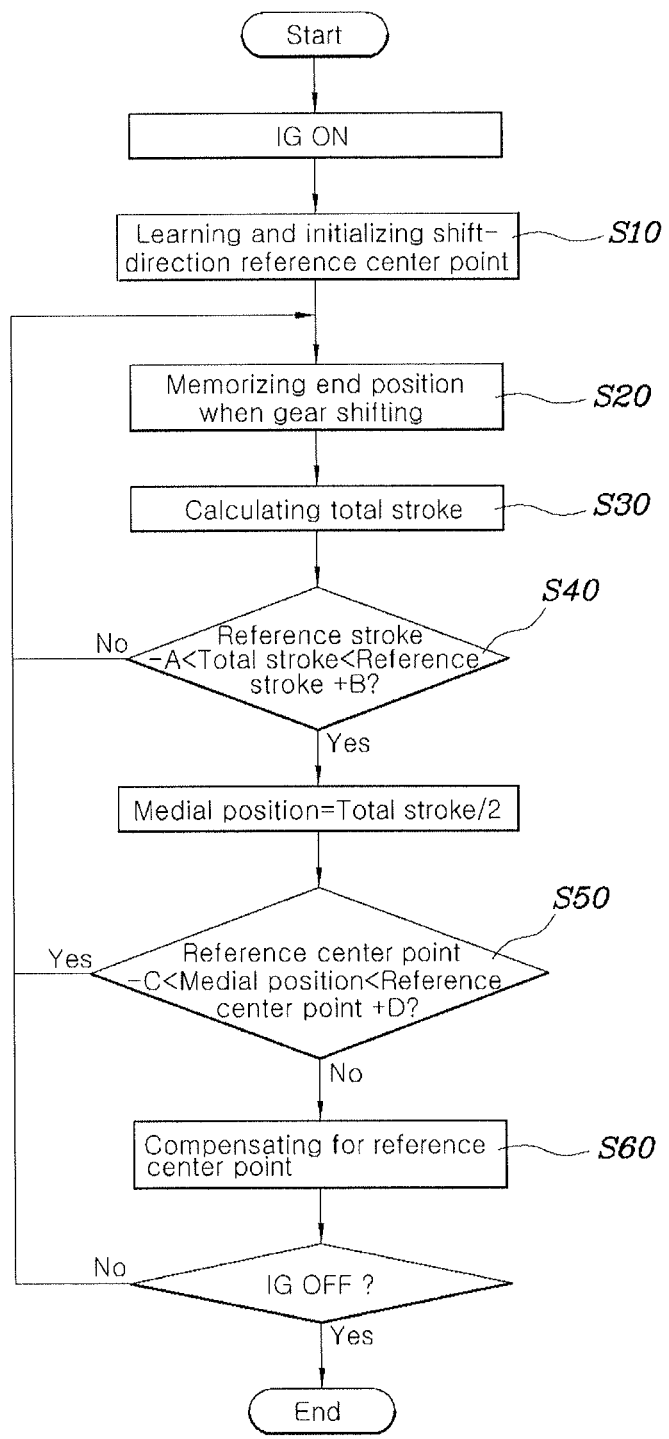
FIG. 2 is a flowchart of an exemplary method of controlling a transmission of a vehicle according to the present invention.
Figure 3:
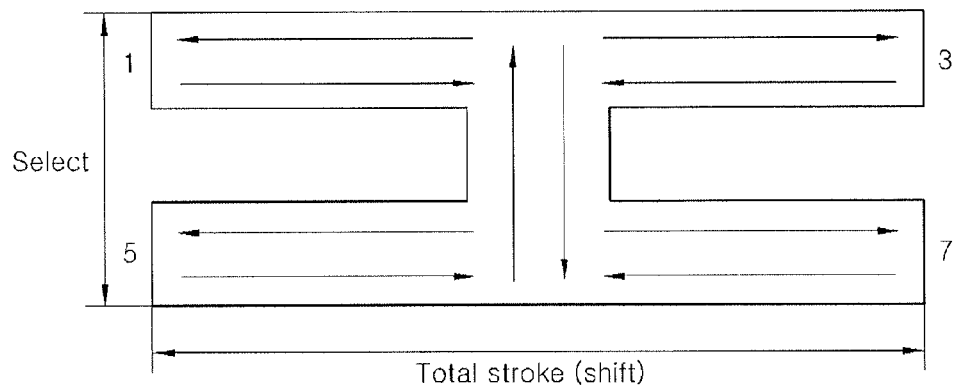
FIG. 3 is a view illustrating a trace of a gear shift finger in response to the operation of an exemplary shift-direction actuator of the vehicle according to the present invention.
Figure 4:
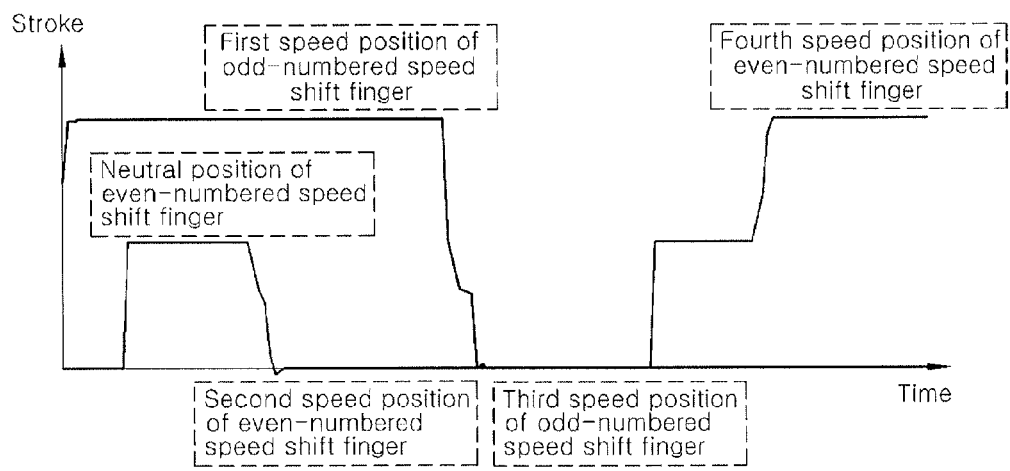
FIG. 4 is a graph showing exemplary shift-direction movement of two gear shift fingers of a DCT as a function of the passage of time, according to the present invention.

Referring to FIGS. 2 through 4, a method of controlling a transmission of a vehicle according to the present invention may include: an end position memorizing operation S20 of memorizing positions of opposite ends of a shift-direction actuator with respect to a shift direction when the shift-direction actuator shifts gears; a stroke calculation operation S30 of calculating a total shift-direction stroke using the positions of the opposite ends of the actuator with respect to the shift direction that are obtained by the end position memorizing operation S20; a validity determining operation S40 of comparing the total stroke calculated in the stroke calculation operation S30 with a reference stroke and determining validity of the total stroke; a center determining operation S50 of comparing a medial position of the total stroke with a current shift-direction reference center point when the total stroke has been determined to be valid in the effectiveness determining operation S40, and determining whether the medial position is within a predetermined critical range; and a center compensating operation S60 of resetting the shift-direction reference center point when the medial position has been determined to be not within the critical range in the center determining operation S50.

When the vehicle is in an IG ON state, an initialization operation S10 of learning the reference center point of the shift-direction actuator and initializing it is conducted. Subsequently, the end position memorizing operation S20 through the center compensating operation S60 are repeatedly conducted until the vehicle enters an IG OFF state.

That is, in the conventional technique, only when the vehicle is in the IG ON state is the learning of the reference center point of the shift-direction actuator conducted in the initialization operation S10, but after that, there is no separate compensation measure. Unlike the conventional technique, in the present invention, even after the initialization operation S10, the end position memorizing operation S20 through the center compensating operation S60 is successively conducted. Therefore, the present invention can actively continuously compensate for displacement of the reference center point attributable to electrical disturbance, mechanical vibration, or deformation which may be caused while the vehicle is running. Thereby, reliable gear shifting manipulation ability can be secured.

In gear shifting performed after the initialization operation S10, the end position memorizing operation S20 includes memorizing, in order, end points which are final points of actual shift-direction movement of a shifting finger, so that the positions of the opposite ends of the actuator with respect to the shift direction which are needed in the stroke calculation operation S30 can be ultimately secured.

The operation trace of the shift finger in odd-numbered speeds of a DCT will be explained with reference to FIG. 3. If the shift finger moves in the horizontal direction of FIG. 3, this refers to a shift-direction operation. If the shift finger moves in the vertical direction of FIG. 3, this refers to a select-direction operation. For example, when the gear is shifted to a position of first speed, the end position memorizing operation S20 is conducted. Thereafter, when the gear is shifted to a position of third speed, the end position memorizing operation S20 is conducted again so that the positions of the opposite ends with respect to the shift direction which is required in the stroke calculation operation S30 can be obtained. Ultimately, the total stroke and the medial position thereof can be calculated.

FIG. 4 illustrates the movement of the shift finger in the odd-numbered speeds and the even-numbered speeds of the DCT as time passes. In detail, this drawing shows a process of moving the odd-numbered shift finger from the first speed to the third speed, and a process of moving the even-numbered shift finger from the neutral position to the second speed and then moving it to the fourth speed after passing through the neutral position for a moment.

In the case of the odd-numbered shift finger, the end position memorizing operation S20 is conducted at each of the positions of the first speed and the third speed. After the end position memorizing operation S20 has been conducted at the position of the third speed, the stroke calculation operation S30 can be conducted. In the case of the even-numbered shift finger, the end position memorizing operation S20 is conducted at each of the positions of the second speed and the fourth speed. After the end position memorizing operation S20 has been conducted at the position of the fourth speed, the stroke calculation operation S30 can be conducted.

In the validity determining operation S40, when the calculated total stroke is within a predetermined range based on the reference stroke, the total stroke is determined to be valid.

That is, as shown in FIG. 2, if the total stroke is within a range which is defined between a value that is less than the reference stroke by A and a value that is greater than the reference stroke by B, the total stroke is determined to be a valid stroke. If the total stroke is not within this range, it is determined to be not valid. Because the following processes cannot continue with this invalid stroke, the loop is repeated from the end position memorizing operation S20 until a valid total stroke is obtained.

The reference stroke is a preset value and means a stroke when the shift finger normally moves in the shift direction. The A and B may be the same value or, alternatively, they may differ from each other. The A and B may be values which are appropriately obtained from a plurality of tests and analysis and by which the range that enables to determine whether the total stroke is valid or not is defined.

After the valid total stroke has been determined, in the center determining operation S50, the total stroke is divided by two to determine the medial position. Thereafter, this medial position is compared with the shift-direction reference center point that is currently set. As shown in FIG. 2, the predetermined critical range is set as a range which is defined between a value that is less than the reference center point by C and a value that is greater than the reference center point by D. If the medial position is within this range, the current reference center point is used intact. If the medial position is not within this range, the center compensating operation S60 is conducted to set a new reference center point.

In the same manner, the C and D may be determined to be the same value or, alternatively, different values. Also, the C and D are values that are appropriately preset by a plurality of tests and analyses.

In the center compensating operation S60, if the gear is being shifted, the center compensating operation S60 cannot be conducted. Therefore, in the case of the DCT, when the DCT is using an odd-numbered gear to transmit power, the center compensating operation S60 is conducted for the even-numbered speed side shift-direction actuator. When the DCT is using an even-numbered gear to transmit power, the center compensating operation S60 is conducted for the odd-numbered speed side shift-direction actuator.

The AMT, as opposed to the DCT, is configured such that the center compensating operation S60 is conducted at appropriate timing in which the gear shifting is not performed.

In the center compensating operation S60, the medial position that has been used in the center determining operation S50 can be used to reset a new shift-direction reference center point.

In other words, the medial position that has been used in the center determining operation S50 may be completely substituted for the previous reference center point and used for the new shift-direction reference center point. Alternatively, the medial position may be used to change the previous reference center position in a predetermined ratio. Given the reliability of the control, the medial position may be used to compensate for the previous reference center point at a predetermined ratio rather than completely substituting for the previous reference center point.

For example, the compensation may be carried out in such a way that, if the medial position is displaced from the previous reference center point by 1 mm, it is moved in the opposite direction by 0.2 mm, which is 20% of 1 mm.

In the center compensating operation S60, after the center determining operation S50, the shift-direction actuator may be operated to relearn the position of the reference center point and reset it.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a transmission of a vehicle, comprising:
    an end position memorizing operation of memorizing positions of opposite ends of a shift-direction actuator with respect to a shift direction in which the shift-direction actuator shifts gears;
    a stroke calculation operation of calculating a total shift-direction stroke using the positions of the opposite ends of the shift-direction actuator with respect to the shift direction that are obtained by the end position memorizing operation;
    a validity determining operation of comparing the total stroke calculated in the stroke calculation operation with a reference stroke and determining validity of the total stroke;
    a center determining operation of comparing a medial position of the total stroke with a current shift-direction reference center point of the shift-direction actuator when the total stroke has been determined to be valid in the validity determining operation, and determining whether the medial position is within a predetermined critical range; and
    a center compensating operation of resetting the shift-direction reference center point for the shift-direction actuator when the medial position has been determined to be not within the critical range in the center determining operation, thereby maintaining the shift-direction reference center point of the shift-direction actuator at a correct position.

2. The method as set forth in claim 1, wherein when the vehicle is in an IG ON state, after an initialization operation of learning the reference center point of the shift-direction actuator and initializing the reference center point is conducted, the end position memorizing operation, the stroke calculation operation, the validity determining operation, the center determining operation and the center compensating operation are repeatedly conducted until the vehicle enters an IG OFF state.

3. The method as set forth in claim 1, wherein in a case of a dual clutch transmission (DCT):
    when the DCT is using an odd-numbered gear to transmit power, the center compensating operation is conducted for an even-numbered speed side shift-direction actuator; and
    when the DCT is using an even-numbered gear to transmit power, the center compensating operation is conducted for an odd-numbered speed side shift-direction actuator.

4. The method as set forth in claim 1, wherein in the validity determining operation, when the calculated total stroke is within a predetermined range based on the reference stroke, the total stroke is determined to be valid.

5. The method as set forth in claim 1, wherein the center compensating operation comprises:
    resetting a new shift-direction reference center point using the medial position that has been used in the center determining operation.

6. The method as set forth in claim 1, wherein the center compensating operation comprises:
    operating the shift-direction actuator after the center determining operation, and relearning and resetting a reference center point.

* * * * *